United States Patent

Gutshall

[15] 3,656,396
[45] Apr. 18, 1972

[54] PROTECTIVE FASTENER HEAD
[72] Inventor: Charles E. Gutshall, Ellwood City, Pa.
[73] Assignee: Textron, Inc., Providence, R.I.
[22] Filed: Aug. 5, 1970
[21] Appl. No.: 61,058

[52] U.S. Cl. ................................................. 85/9, 85/45
[51] Int. Cl. .................................. F16b 23/00, F16b 35/00
[58] Field of Search ............ 85/9 R, 45, 61, 32 R, 32 W;
151/48; 145/50 R, 50 D

[56] References Cited

UNITED STATES PATENTS

| 819,172 | 5/1906 | Savoie | 151/48 X |
| 2,813,450 | 11/1957 | Dzus | 85/45 |
| 2,814,059 | 11/1957 | Lehning | 85/45 X |
| 3,354,757 | 11/1967 | Grimm et al. | 85/45 X |

FOREIGN PATENTS OR APPLICATIONS

| 13,555 | 10/1913 | Great Britain | 85/45 |

Primary Examiner—Ramon S. Britts
Attorney—Webb, Burden, Robinson & Webb

[57] ABSTRACT

A fastener having a head such as a hex head in which each side of the head is formed of two obtusely intersecting plane surfaces in which the line of intersection is positioned adjacent the leading edge of each corner which receives the turning torque from a driving tool. The head can terminate in a washer base having a plurality of embossments spaced there around and in line with the bottom contacting surf

4 Claims, 5 Drawing Figures

PATENTED APR 18 1972　　3,656,396

INVENTOR.
Charles E. Gutshall
BY Webb Burden
Robinson & Webb
HIS ATTORNEYS

INVENTOR.
Charles E. Gutshall
BY Webb Burden
Robinson & Webb
HIS ATTORNEYS

PROTECTIVE FASTENER HEAD

This invention relates to fasteners and, more particularly, to the fastener heads. When painted fasteners such as hexagon headed screws are inserted by power driven tools, the socket portion of the tool fits over and around the screw head causing defacement of the painted surface of the head in contact with the socket at the time that the torque and the axial pressure of the tool are applied. In addition, self-drilling or self-extruding screws, painted or unpainted, that are driven by high speed drivers (2,500 rpm) require either a head terminating in a washer or a Phillips type head to provide stability for the fastener to prevent wobble so the fastener will not fall over, and so rapid and efficient placement of the fastener occurs. When a painted fastener having a head terminating in a washer is employed, additional defacement of the upper surface of the washer occurs from the frictional contact with the bottom surface of the rotating tool socket.

My invention substantially reduces the radial and axial contact areas between a socket and the fastener head thereby minimizing the area of paint damage. In addition, my head design, by virtue of its wedging characteristics, provides an improved screw head from the standpoint of stability to permit easy application by power tools. Further, where a washer is incorporated as part of the head design, my invention minimizes the contact between the bottom surface of the tool and the top surface of the washer upon which the tool normally rides. In addition, my improved head design permits easier socket entry while, at the same time, minimizing the contact areas of the driving tool.

My invention is a fastener having a polysided and cornered head, in which the sides of the head are formed of two obtusely intersecting plane surfaces or arcuates defining a similar form in which the line of intersection is substantially adjacent the leading edge of each corner which receives the turning torque from a tool. My fastener head can be further improved where a washer is an integral part of the head by providing embossments on the washer which are spaced and in alignment with the contacting bottom surface of the tool.

In the accompanying drawings, I have shown my presently preferred embodiments in which.

Figure 1:
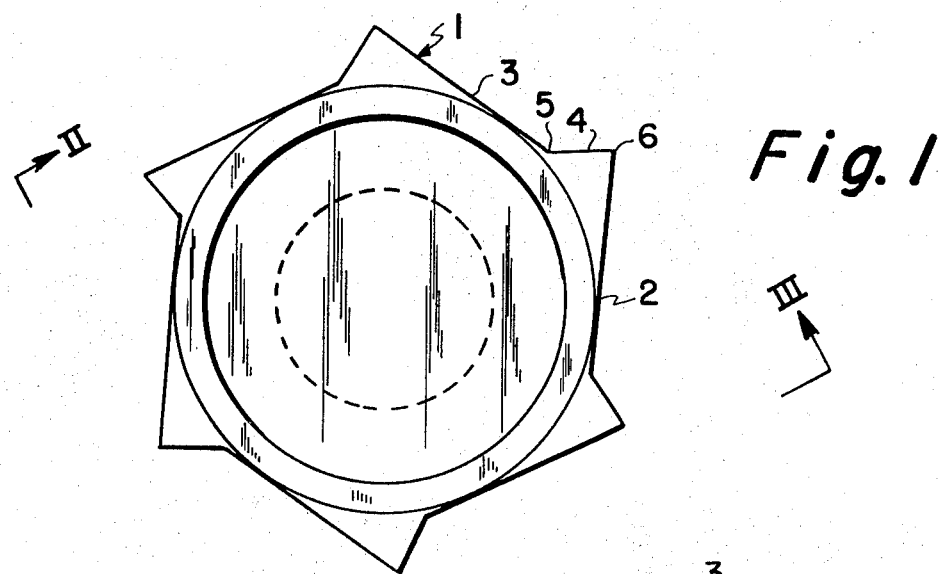
FIG. 1 is a plan view of my improved protective fastener head.
Figure 2:
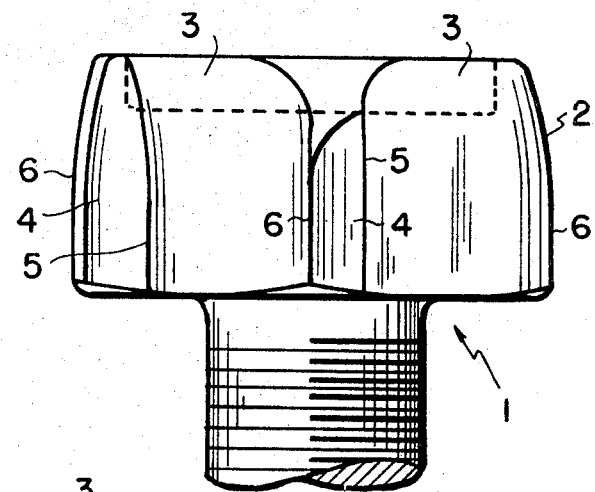
FIG. 2 is a view taken along lines II—II of FIG. 1.
Figure 3:
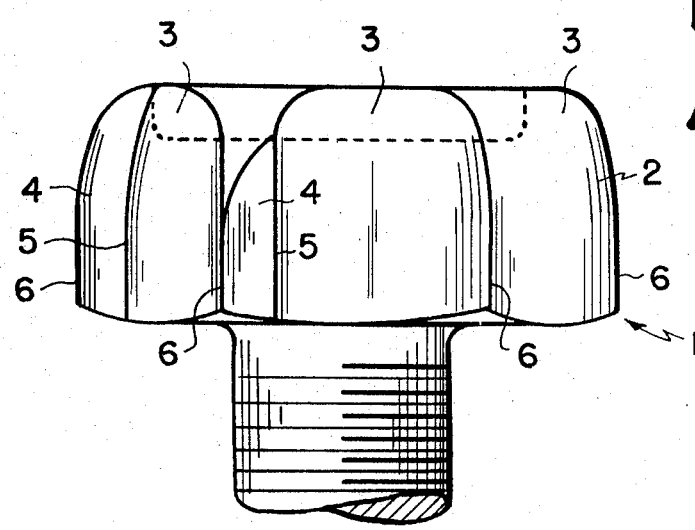
FIG. 3 is a view taken along lines III—III of FIG. 1.

My head design is applicable to any polysided fastener head, but for ease and clarity of presentation, I will direct my embodiments to the standard hexagon head. A hexagon headed fastener, generally designated 1 and having a hex head 2, is shown in FIGS. 1-3. As best seen in FIG. 1, each of the six sides of the hex head is formed of obtusely intersecting plane surfaces 3 and 4. These plane surfaces 3 and 4 intersect at line 5, which represents the apex of the obtuse angle.

This intersection at line 5 is positioned substantially adjacent the corner 6 in such a manner that the shortest plane surface 4 forms the leading edge of the corner 6. In a normal clockwise tightening operation, the torque exerted by a driving too will initially be along this leading edge of corners 6 formed by surface 4.

It will be appreciated by those skilled in the art that the intersection at line 5 may be rounded slightly to define an arcuate of similar form. As used hereinafter, the obtusely intersecting plane surfaces include the circumstance whereby an arcuate of similar form is present.

As shown in FIG. 3, the corner 6 can be rounded or chamfered substantially along the upper portion thereof so that the actual surface in contact with the socket will have a minimum height of one-half the height of the fastener head 2. This permits rapid positioning of the driving tool over the head 2. The minimum height is necessary to assure sufficient contacting surface of the tool to drive the fastener.

Figure 4:
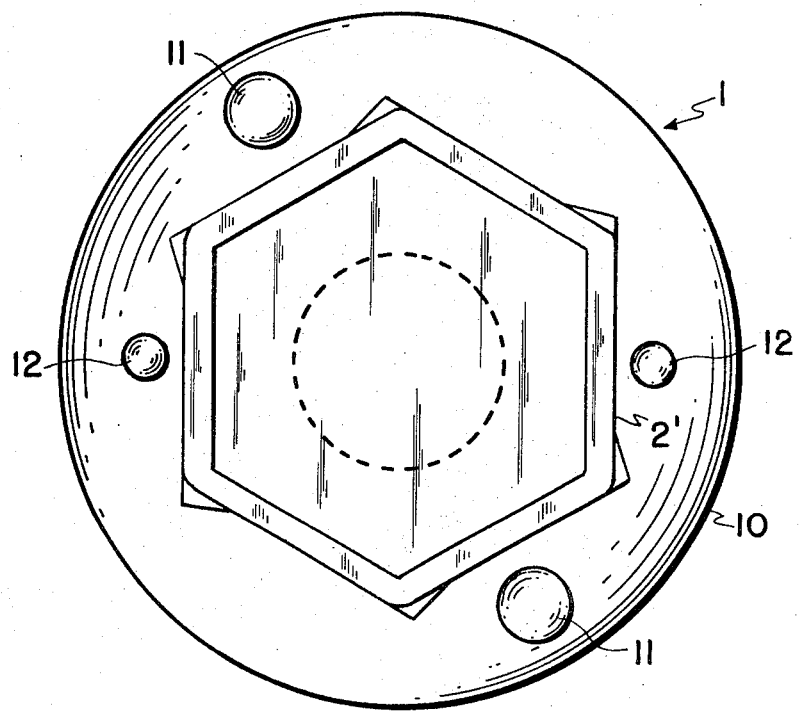
FIG. 4 is a further embodiment in which the hex head incorporates an integral washer.
Figure 5:
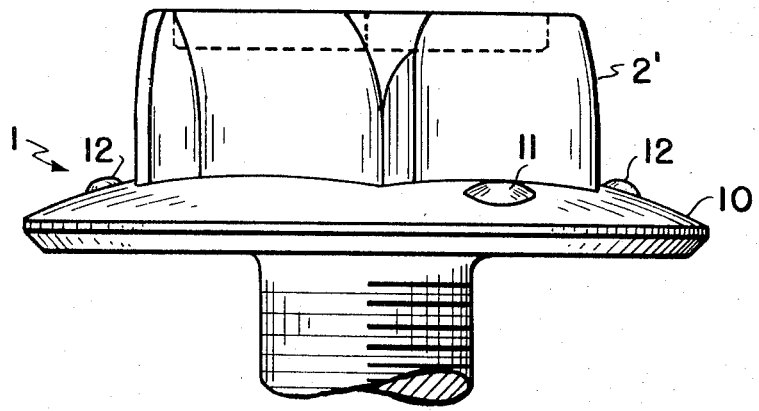
FIG. 5 is a view of the embodiment of FIG. 4.

In many applications the fastener head terminates in a washer 10 as shown in FIGS. 4 and 5, the head portion 2' being similar to the embodiment of FIGS. 1-3. The washer base 10 has a series of embossments 11 and 12 depending upwardly from the top surface of the washer base 10. These embossments are spaced on the washer portion 10 about the head portion 2' and are positioned to contact the bottom surface of a socket positioned on the head 2' for driving the fastener 1. Since the bottom surface of the socket is aligned with the embossments 11 and 12, the surface of the washer 10 is protected from defacement resulting from the axial and torque forces of the driving tool.

It has been found that the embossments themselves suffer the least amount of defacement if they are nonspherical in shape. In addition, the embossments are staggered around the periphery with respect to their size. That is, embossment 11 is larger than embossment 12. Of course, the embossments could all be of the same size, but by alternating them, one can further minimize the surface available for defacement while at the same time providing sufficient surface for the torquing tool to contact. Further, embossments, ridges, sharp edges, points, etc. are known to accept heavier coatings of electroplate and, therefore, are more inclined to endure the "defacements" with less damage than other planar surfaces.

The dimensioning of these abnormally shaped corners can be altered depending on the application. For example, the extreme periphery of the corners can represent the standard head dimension. In this instance, surface contact with a driving tool is minimized making the application amenable to painted fasteners. On the other hand, where a nonpainted fastener is applied by a rapidly rotating driving tool, the corners can slightly exceed the standard dimension. This results in wedging effect when used with a standard socket, but it maximizes the stability of the fastener in the socket, thereby increasing efficiency in tightening a large number of fasteners in a given time period.

While I have shown and described preferred embodiments of my invention, it may be otherwise embodied within the scope of the appended claims.

I claim:

1. In a fastener for receiving a turning torque from a tool and having a polysided and cornered head, the improvement comprising each side including two obtusely intersecting plane surfaces in which the line of intersection is substantially adjacent a leading edge of the corner receiving the turning torque for tightening, said corners being substantially chamfered along the upper portion thereof by an amount up to 50 percent of the height of the head to facilitate accommodating the tool.

2. In a fastener for receiving a turning torque from a tool and having a polysided and cornered head, the improvement comprising each side including two obtusely intersecting plane surfaces in which the line of intersection is substantially adjacent a leading edge of the corner receiving the turning torque for tightening, said head terminating in a washer base having a plurality of spaced protuberances depending upwardly from the top surface of the washer and positioned in alignment with the contacting bottom surface of the tool.

3. The fastener of claim 2 wherein the protuberances are nonspherical embossments.

4. The fastener of claim 3 wherein every other embossment is of the same size but adjacent embossments are of different sizes.

* * * * *